United States Patent
Bengtsson

(10) Patent No.: US 7,777,471 B2
(45) Date of Patent: Aug. 17, 2010

(54) AUTOMATED SLEEP SEQUENCE

(75) Inventor: Agneta Bengtsson, Eslöv (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 35 days.

(21) Appl. No.: 12/286,385

(22) Filed: Sep. 30, 2008

(65) Prior Publication Data
US 2010/0079201 A1 Apr. 1, 2010

(51) Int. Cl.
G05F 1/00 (2006.01)
(52) U.S. Cl. .................................................. 323/283
(58) Field of Classification Search .............. 323/234, 323/283, 284
See application file for complete search history.

(56) References Cited

U.S. PATENT DOCUMENTS

| | | | |
|---|---|---|---|
| 6,356,538 B1 * | 3/2002 | Li ........................... | 370/311 |
| 6,973,337 B2 * | 12/2005 | Jiguet et al. .............. | 455/574 |
| 7,266,709 B2 * | 9/2007 | Chapuis et al. ........... | 713/300 |
| 7,352,207 B2 * | 4/2008 | Garlapati et al. ......... | 326/68 |
| 7,369,815 B2 * | 5/2008 | Kang et al. ............... | 455/73 |
| 2005/0215226 A1 | 9/2005 | Tahtinen | |
| 2008/0004894 A1 * | 1/2008 | Son et al. ................. | 705/1 |
| 2008/0067995 A1 * | 3/2008 | Chua-Eoan et al. ...... | 323/284 |
| 2008/0225563 A1 * | 9/2008 | Seo .......................... | 363/123 |

FOREIGN PATENT DOCUMENTS

| | | |
|---|---|---|
| EP | 1 912 338 | 4/2008 |
| WO | WO 2004/051877 | 6/2004 |
| WO | WO 2007/049203 | 5/2007 |

* cited by examiner

Primary Examiner—Adolf Berhane
Assistant Examiner—Yemane Mehari
(74) Attorney, Agent, or Firm—Potomac Patent Group PLLC

(57) ABSTRACT

An analog baseband, a computer readable medium, and a method for powering on and off a set of regulators in the analog baseband, where each regulator is configured to provide a predefined voltage. The method includes storing in a register of the analog baseband at least n bits, where n is an integer larger than 2, assigning in the analog baseband, to each regulator, a number of m bits of the n bits, where m times a number of the regulators is smaller than or equal to n, programming in the analog baseband the at least n bits in a sequence of m bits that describes a time when each regulator is powered on or off and an order in which each regulator is powered on or off upon reception of a sleep signal, receiving in the analog baseband the sleep signal that indicates whether the set of regulators are powered on or off, and instructing, based on sequence of m bits stored in the registers of the analog baseband, the set of regulators to power on or off based on the received sleep signal.

22 Claims, 8 Drawing Sheets

AUTOMATED SLEEP SEQUENCE

TECHNICAL FIELD

The present invention generally relates to devices, software and methods and, more particularly, to mechanisms and techniques for powering on and off regulators of the device.

BACKGROUND

During the past years, the interest in mobile devices that are functioning not only as phones capable to provide services for voice, video and data but also as camera, radio, etc. has increased. These new capabilities of the phones or other mobile devices require that various voltages are supplied to the various modules that provide the above noted supplemental capabilities, i.e., a first voltage for the camera, a second voltage for the radio, a third voltage for some elements of the phone, etc. However, the power used by these modules becomes significant, even when the functions of the modules are not performed. Because most of the mobile devices draw their power from a battery that has a limited capacity and size, the power used by any additional module in the mobile device should be monitored and reduced to a minimum to allow the mobile device to perform other functions for as long as possible.

Thus, to conserve power and extend a standby time between battery recharges, the mobile devices have their processors configured to shut down or place in a sleeping mode various radio interface related components (e.g., power amplifiers, oscillators, and so on) in order to conserve the battery power. These components are associated with the radio interface of the mobile device. The existing techniques require that the processor, which is part of the mobile device, communicates with these various components of the radio interface and other parts of the mobile device before shutting down the various components. This communication generates an increased processor traffic, which might slow down the mobile device and also may increase the power consumption, which is undesirable.

According to existing mobile devices, extended processor communication is generated for placing regulators into a sleep mode and/or to wake the regulators up from the sleep mode. The regulators are those parts that generate accurate voltage levels to the different components of the mobile platform. Generally, a regulator may include control units and power supply units. Because the battery voltage varies dependent on the capacity left in the battery, the components within the mobile platform need voltage levels that are accurate with only a minor variation of the voltage level irrespective of the battery capacity and load. Thus, the regulators are designed to provide this accurate voltage level to the various components of the mobile device irrespective of the status of the battery. Examples of regulators are known to those skilled in the art and one such example is shown in FIG. 1.

However, even these regulators are using electric power, thus draining the battery when no functions are performed. In this regard, FIG. 1 shows how a set of low drop-out (LDO) regulators 10 is implemented in existing mobile platforms. A battery 11 is the power supply to the Application Specific Integrated Circuit (ASIC), which is not shown in the figure. The battery voltage (BV) is regulated by various LDO regulators 12 to the desired voltage levels with very low drop out voltage over load. Each LDO regulator 12 constitutes the power supply unit for one or more components of the mobile platform, for example, processors (P1) and (P2), an oscillator (O), amplifiers (A1) and (A2), etc., as shown in FIG. 1. As noted above, these components of the mobile platform are related to the radio part of the mobile device. As the mobile device may sporadically communicate information with a serving base station, various components of the radio interface may be entered into a sleep mode to reduce the power consumption. The mobile device monitors, based on some core components that are not entering into the sleep mode, a page channel for example, and reactivates the components entered into the sleep mode when a communication is initiated between the mobile device and the serving base station. As previously discussed, the configuration shown in FIG. 1 requires extended communication between the core components (processor) and the non-core components for deciding which non-core components are to be suspended.

All these radio elements may use different voltages and therefore, they may also need different LDOs in the platform. Software control for the LDOs 12 is achieved by using an interface 14. Registers (not shown) within the ASIC (conventionally more than one register for each LDO) enable/disable different actions for the LDO 12 and the registers are written or read through the interface 14. Several interface writings are needed to control all the regulators 12 going from/to the sleep mode.

Signals DATA and CLOCK are signals needed to communicate through the interface 14 and signals A and B are sleep signals generated by the main processor of the mobile platform when the processor requests that parts of the system should enter to or exit out the sleep mode. The Sleep A and Sleep B signals shown in FIG. 1 are received at a sleep control (SC) unit 16 and based on these signals, the various LDOs 12 are entered into the sleep mode.

Thus, the communications of the main processor with the interface 14 and other components of the device 10 take not only processor time but also battery power. Accordingly, it would be desirable to provide devices, systems and methods that avoid the afore-described problems and drawbacks.

SUMMARY

According to one exemplary embodiment, there is a method for powering on and off a set of regulators in an analog baseband, where each regulator is configured to provide a predefined voltage. The method includes storing in a register of the analog baseband at least n bits, where n is an integer larger than 2; assigning in the analog baseband, to each regulator, a number of m bits of the n bits, where m times a number of the regulators is smaller than or equal to n; programming in the analog baseband the at least n bits in a sequence of m bits that describes a time when each regulator is powered on or off and an order in which each regulator is powered on or off upon reception of a sleep signal; receiving in the analog baseband the sleep signal that indicates whether the set of regulators are powered on or off; and instructing, based on sequence of m bits stored in the registers of the analog baseband, the set of regulators to power on or off based on the received sleep signal.

According to another exemplary embodiment, there is an analog baseband for powering on and off a set of regulators in a mobile platform. The analog baseband includes the set of regulators, each configured to provide a predetermined voltage to a corresponding component of the mobile platform; a register connected to the set of regulators and configured to store at least n bits, where n is an integer larger than 2, the register being also configured to assign to each regulator a number of m bits of the n bits, wherein m times a number of the regulators is smaller than or equal to n, the at least n bits being programmed in a sequence of m bits that describes a time when each regulator is powered on or off and an order in which each regulator is powered on or off upon reception of a sleep signal in the analog baseband; and an input/output interface configured to receive the sleep signal, which indicates whether the set of regulators are powered on or off.

According to still another exemplary embodiment, there is an analog baseband for powering on and off a set of means for regulating in a mobile platform. The analog baseband includes the means of regulating, which are configured to provide a predetermined voltage to a corresponding component of the mobile platform; means for storing bits connected to the means for regulating and configured to store at least n bits, where n is an integer larger than 2, the means for storing being also configured to assign to each means for regulating a number of m bits of the n bits, wherein m times a number of the means for regulating is smaller than or equal to n, the at least n bits being programmed in a sequence of m bits that describes a time when each means for regulating is powered on or off and an order in which each means for regulating is powered on or off upon reception of a sleep signal in the analog baseband; and an input/output interface configured to receive the sleep signal and to inform the analog baseband about receiving the sleep signal, which indicates whether the set of means for regulating are powered on or off.

According to still another exemplary embodiment, there is a computer readable medium including computer executable instructions, wherein the instructions, when executed by a processor, cause the processor to perform instructions for powering on and off a set of regulators in an analog baseband, wherein each regulator is configured to provide a predefined voltage. The instructions include storing in a register of the analog baseband at least n bits, where n is an integer larger than 2; assigning in the analog baseband, to each regulator, a number of m bits of the n bits, wherein m times a number of the regulators is smaller than or equal to n; programming in the analog baseband the at least n bits in a sequence of m bits that describes a time when each regulator is powered on or off and an order in which each regulator is powered on or off upon reception of a sleep signal; receiving in the analog baseband the sleep signal that indicates whether the set of regulators are powered on or off; and instructing, based on sequence of m bits stored in the registers of the analog baseband, the set of regulators to power on or of based on the received sleep signal.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a mobile phone. However, the embodiments to be discussed next are not limited to the mobile phone but may be applied to other devices that are operated based on a battery.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
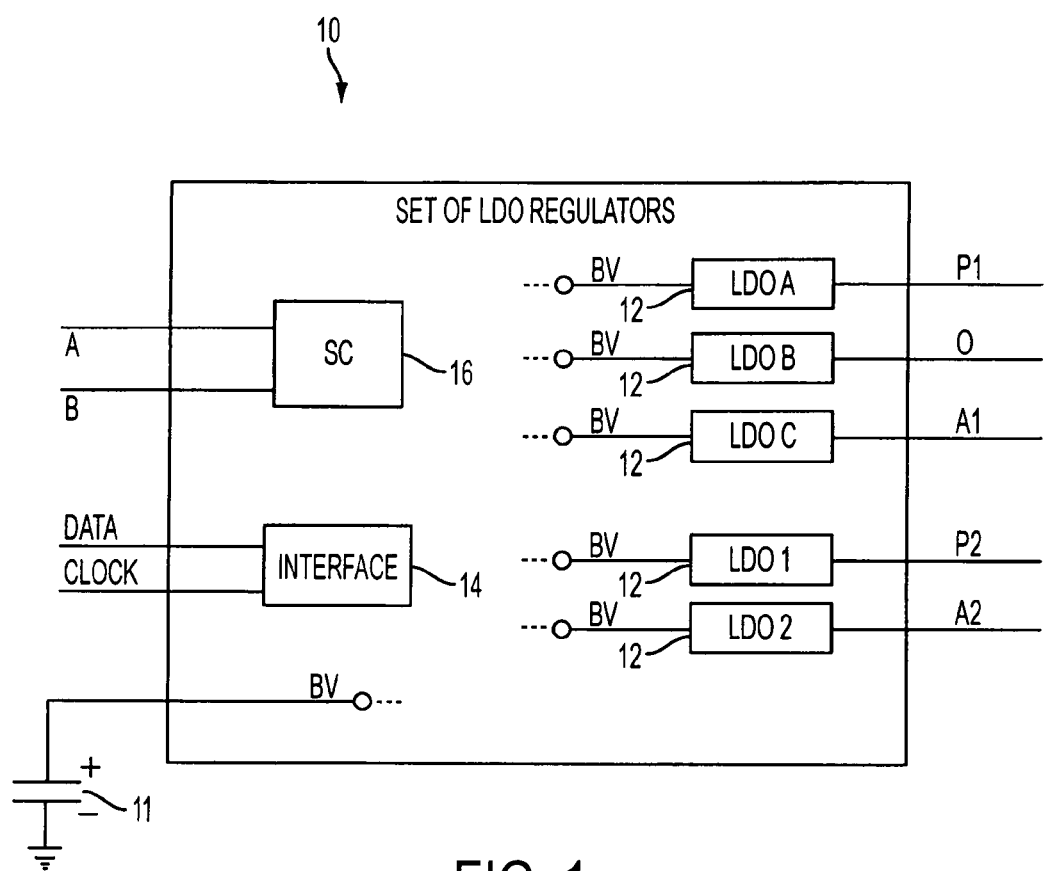
FIG. 1 is a schematic diagram of a set of LDO regulators.
Figure 2:
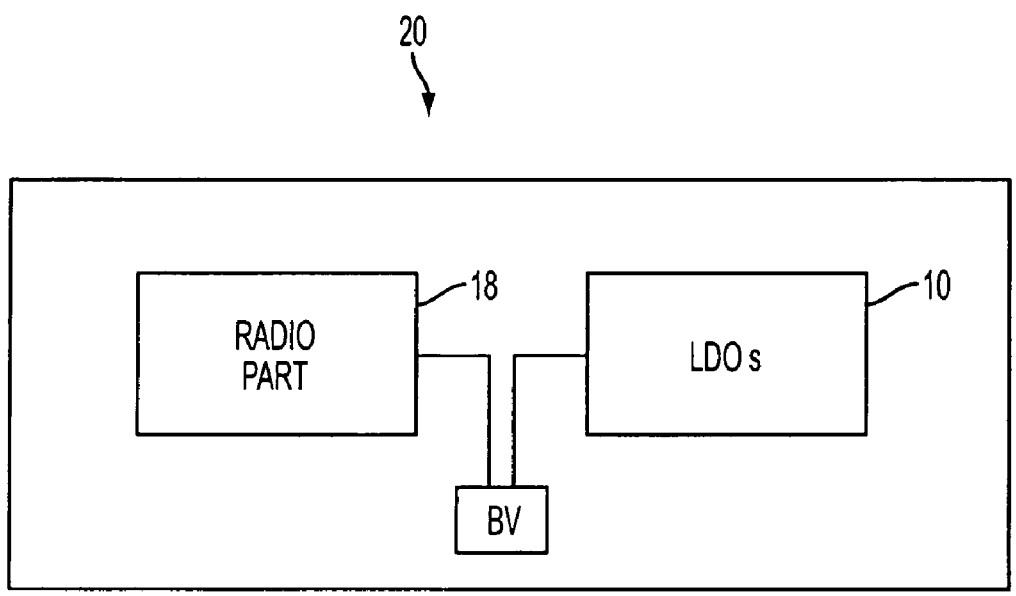
FIG. 2 is a schematic diagram showing components of a mobile platform divided in various classes, according to an exemplary embodiment.

As shown in FIG. 2, according to an exemplary embodiment, a general mobile system 20 (mobile platform for example) includes at least the set of LDO regulators 10 and a radio part 18. In the communication mobile system, the radio part 18 is responsible for performing the communications between a base station (not shown) and the mobile system 20. As discussed in the background section, there are techniques for switching off or on or entering into a sleep mode various parts of the radio part 18 of the mobile device 20. However, none of those techniques are designed for switching on and off or turning into the sleep mode various components of the mobile system 20 that are not related to the radio part, for example the set of LDO regulators 10. These non-radio components are related to functions associated, for example, with a camera, audio, display, etc.

Figure 3:
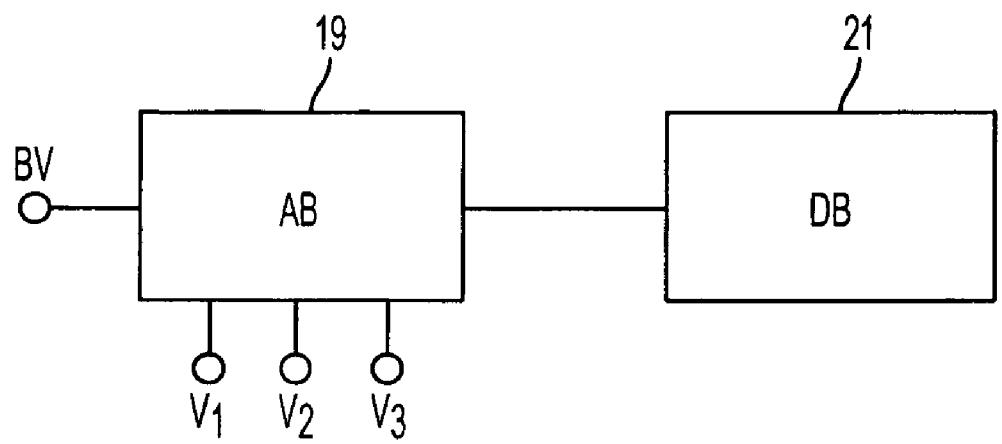
FIG. 3 is a schematic diagram showing an analog baseband according to an exemplary embodiment.

According to an exemplary embodiment, the mobile device is configured to turn on and off the regulators automatically, in a controlled and programmable time sequence, without causing dangerous spikes in the main power source (battery) and also to save communication time between an analog baseband and a digital baseband. In the context of this specification, the analog baseband may be a module or a part of the mobile platform that receives as an input the battery voltage BV and is responsible for outputting various voltages. Thus, the analog baseband operates in the analog domain. FIG. 3 shows the analog baseband (AB) 19 with the input and outputs discussed above. The analog baseband 19 may include the set of regulators 10. In addition, FIG. 3 shows the analog baseband connected to the digital baseband (DB) 21. The digital baseband 21 is, according to this disclosure, that part of the mobile platform 20 that is responsible for the overall functionality of the mobile platform. The digital baseband 21 is configured to operate in the digital domain. For example, the digital baseband 21 may include the main processor and a memory. The sleep sequence, which is programmable, may always be the same and thus, no communication is needed after the first setup of the sleep sequence of the regulators. However, the sleep sequence may be changed/programmed as desired. These features are discussed in more details next.

Figure 4:
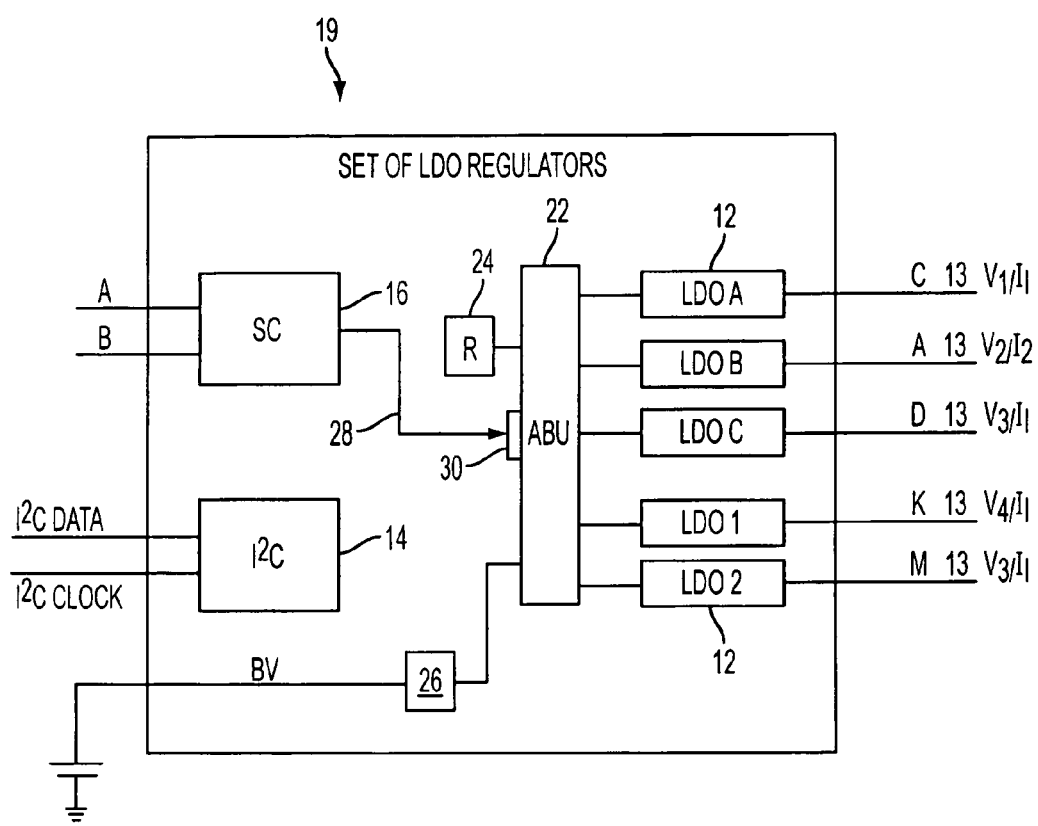
FIG. 4 is a schematic diagram showing a set of LDO regulators according to an exemplary embodiment.

According to another embodiment illustrated in FIG. 4, various components 13 (a camera C, an audio part A, a display D, a keyboard K, a mic M, etc.) of the mobile platform that are not related to the radio interface, are entered into the sleep mode by turning off their corresponding LDO regulators 12 in a controlled way. To achieve this, the analog baseband 19 may include an analog baseband unit (ABU) 22, which connects the regulators 12 to registers 24. The analog baseband 19 needs to turn off the LDO regulators 12 in a time sequence that is written, for example, in registers 24 within the analog baseband 19. The registers 24 may be stored in a memory, as would be appreciated by those skilled in the art. A module 26 may include various other components that are present between the battery voltage input and the analog baseband unit 22. However, module 26 is optional.

The set of LDO regulators 10 is shown in this embodiment to include an inter-integrated circuit (I2C) interface 14. The I2C interface is a multi-master serial bus that is used, for example, to attach low-speed peripherals to a motherboard, embedded system, or cellphone and the multi-master bus is a bus in which there are multiple bus master nodes present on the bus. This interface is used when multiple nodes on the bus may need to initiate transfer. For example, direct memory access (DMA) is used to transfer data between peripherals and memory without the need to use the central processing unit. However, the I2C bus is not required for practicing the exemplary embodiments.

Figure 5:
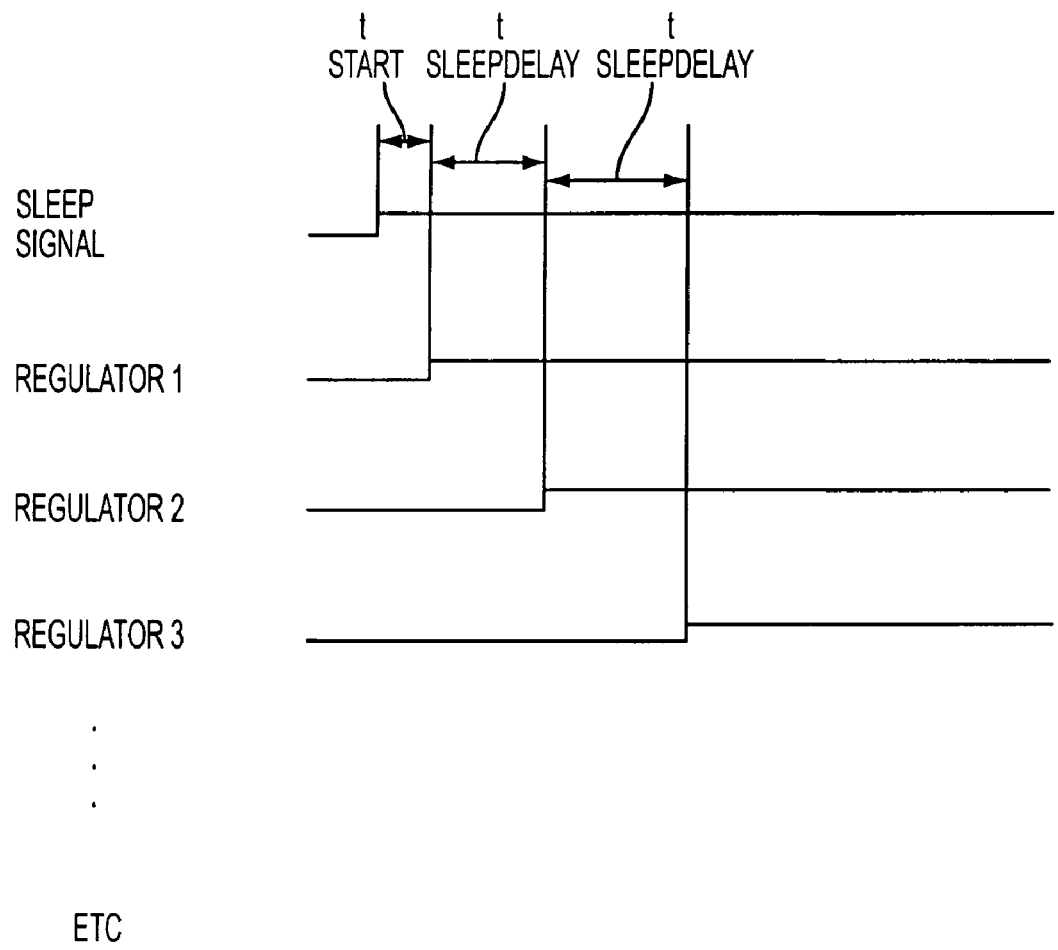
FIG. 5 is a schematic diagram showing a sequence of time delays applied when powering on a set of regulators according to an exemplary embodiment.

When a sleep signal is received by the set of LDO regulators 10 at the sleep pin (located for example at the sleep control 16), the power down sequence of the LDO regulators 12 may start automatically, based on the information stored in the registers 24. A specified time delay between the LDO regulators 12, i.e., a time interval between powering on or off the successive LDO regulators, is for example $t_{sleeptime}$ (as shown in FIG. 5). The time delay may be controlled via the register setting 24 in the analog baseband 19. In addition, a start time $t_{start}$ may be defined for starting the shutting down or up sequence. The start time $t_{start}$ is also programmable in the same way as the $t_{sleeptime}$. In one exemplary embodiment, the set up of the sleep sequence needs to be entered once every time the mobile device recovers from a battery voltage below a shut off voltage. A shut off voltage may be defined as when the battery voltage is below the required voltage limit that the ASIC can perform on. For example, the shut off voltage may be the discharged battery voltage or the removed battery voltage.

Figure 6:
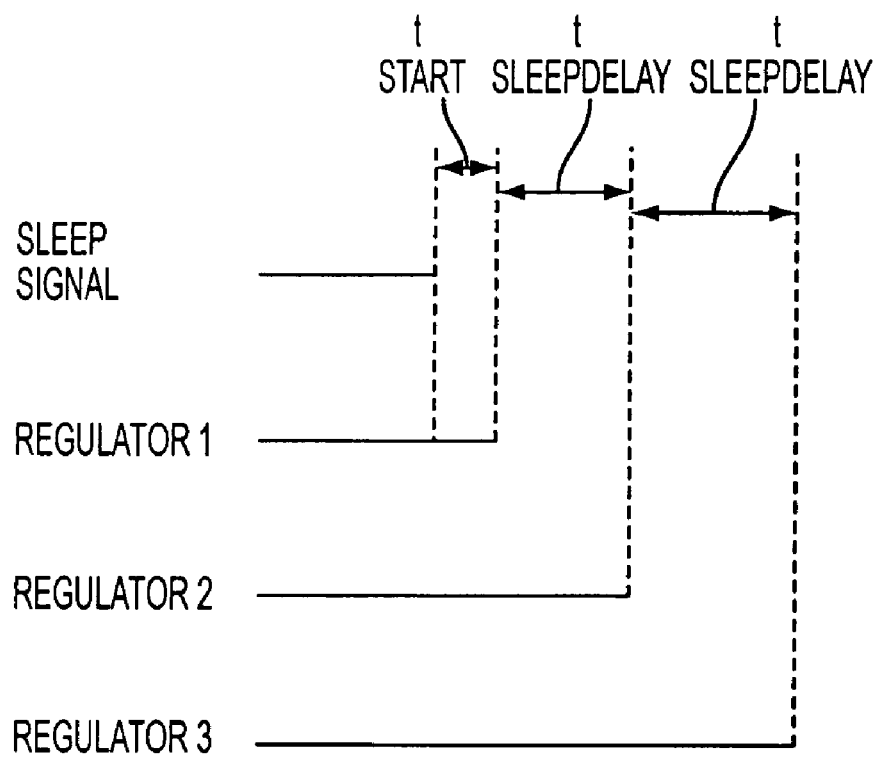
FIG. 6 is a schematic diagram showing a sequence of time delays applied when powering off a set of regulators according to an exemplary embodiment.

FIG. 5 shows a power up sequence of three regulators Regulator 1 to Regulator 3. After a predefined $t_{start}$ delay after a sleep signal is received, Regulator 1 is instructed to power up. After a predefined $t_{sleepdelay}$, Regulator 2 is powered up. After another $t_{sleepdelay}$, Regulator 3 is power up. A power down sequence, similar to the power up sequence of FIG. 5, is shown in FIG. 6. It is noted that the power up or down sequence may be stored in the registers 24.

According to an exemplary embodiment, a single signal is received from the processor, for example, signal A or B at the sleep control 16, and this single signal may trigger the entire sequence discussed with regard to FIGS. 5 and 6. The control 16 may communicate along link 28 with an input/output interface 30 of the analog baseband unit 22, as shown for example in FIG. 4. In other words, there may be no or almost no communication involving the I2C interface 14 for powering on and off all or part of the LDO regulators 12 shown in FIG. 4, which implicitly shut on or off the corresponding camera, audio unit, display, keyboards, microphone, vibration mechanism, etc.

In one exemplary embodiment, the order of LDO regulators 12 to be powered on or off is programmable in the registers 24 as will be discussed next. For example, one 8 bit register in the analog baseband may set the $t_{sleepdelay}$ to be equal between all the regulators. According to another exemplary embodiment, if the size of the registers is not of concern, the $t_{sleepdelay}$ may be different for each regulator. The $t_{start}$ time also may be defined for the sleep signal so that the start of the sequence is preset.

Depending on the number of LDO regulators to be controlled, an appropriate number of bits for the register may be programmed to power up/down the regulators and the order in which the regulators should be powered up/down. For example, depending on the number of the regulators, and a number "m" of bits associated for each regulator, a number "n" of bits may be selected in the register. In an exemplary embodiment, the number "n" is selected to be "m" times the number of LDO regulators. Also, according to an exemplary embodiment, there is possible to choose the number of bits such that no regulator is powered on or off at a certain predetermined time, which is a multiple of the $t_{sleepdelay}$. Thus, it is possible that a time interval between two regulators being powered on or off may be increased.

To illustrate these features, an example is discussed next. The example is not intended to limit the embodiments but only to clarify them. Suppose that the analog baseband has the following LDO regulators: A, B, C, 1, and 2. The regulator sequence bits are defined to control the powering on or off of the LDO regulators and the order in which the LDO regulators are powered up or down. In this example, m=3 bits are needed to represent the LDO regulators in the analog baseband but that is scalable with respect to how many LDO regulators have to be controlled.

In this example, it is assumed that the following 3 bits combinations correspond to the following actions:
000=no LDO regulator is chosen;
001=A;
010=B;
011=C;
100=1;
101=2;
110=no LDO regulators; and
111=no LDO regulators.

The LDO regulators, due to their load, are selected to enter the sleep mode in this order: 1, 2, B and C. LDO regulator A, in this example, is maintaining the basic function of the system so it is not allowed to enter into the sleep mode. The time between LDO regulators 1 and 2 may be longer than a preset $t_{sleeptime}$, and thus, two $t_{sleeptime}$ are selected in this example between the first and second LDO regulators, i.e., no LDO regulator is chosen between LDO regulators 1 and 2.

The desired sleep order of the LDO regulators in this example is selected to be:
Regulator 0: 100;
Regulator 1: 000;
Regulator 2: 101;
Regulator 3: 010;
Regulator 4: 011;
Regulator 5: 000;
Regulator 6: 000; and
Regulator 7: 000.

Thus, it can be seen that the order, the times between the regulators, and which regulators to be powered up or down may be programmed in registers 24. In this last sequence, entry regulator 0 corresponds to real regulator 1, entry regulator 1 corresponds to no real regulator, entry regulator 2 corresponds to real regulator 2 (it is noted that $2xt_{sleepdelay}$ is provided between real regulators 1 and 2), entry regulator 3 corresponds to real regulator B, entry regulator 4 corresponds to real regulator C, and entry regulators 5 to 7 correspond to no real regulators.

Thus, according to one exemplary embodiment, after the system is once set up with a certain sequence including the order of the regulators and at what time each regulator is to be powered on or off, the registers 24 in the analog broadband 19 control each of the regulator for entering into the sleep mode and the main processor does not have to communicate or spend time with another component of the mobile device in order to power on or off the required components. Thus, according to this embodiment, a reduction in the time and traffic occurring in the I2C interface or the main processor is achieved.

According to an exemplary embodiment, the sequence of powering on and off the regulators may be programmable for each mobile platform. In this regard, suppose that a first phone operator desires to use a mobile platform that includes, among other components, two screens, a keypad, an audio part, a display and a mic and a second operator desires to use a mobile platform that includes, among other components, a single screen, a keypad, an audio part and a display. Then, according to this exemplary embodiment, the same method for powering on or off the components may be used for both mobile platforms, i.e., no hardware modification is required to the mobile platforms. The same registers of the analog baseband may be programmed to power on either the first mobile platform based on the following sequence: first screen, second screen, the keypad, the audio part, the display and the mic (in any desired order) or the second mobile platform based on the following sequence: the single screen, the keypad, the audio part and the display (in any desired order). In other words, the powering on and off of the regulators of the mobile platform may be programmed based on the desired application without any change in the hardware of the mobile platform.

Figure 7:
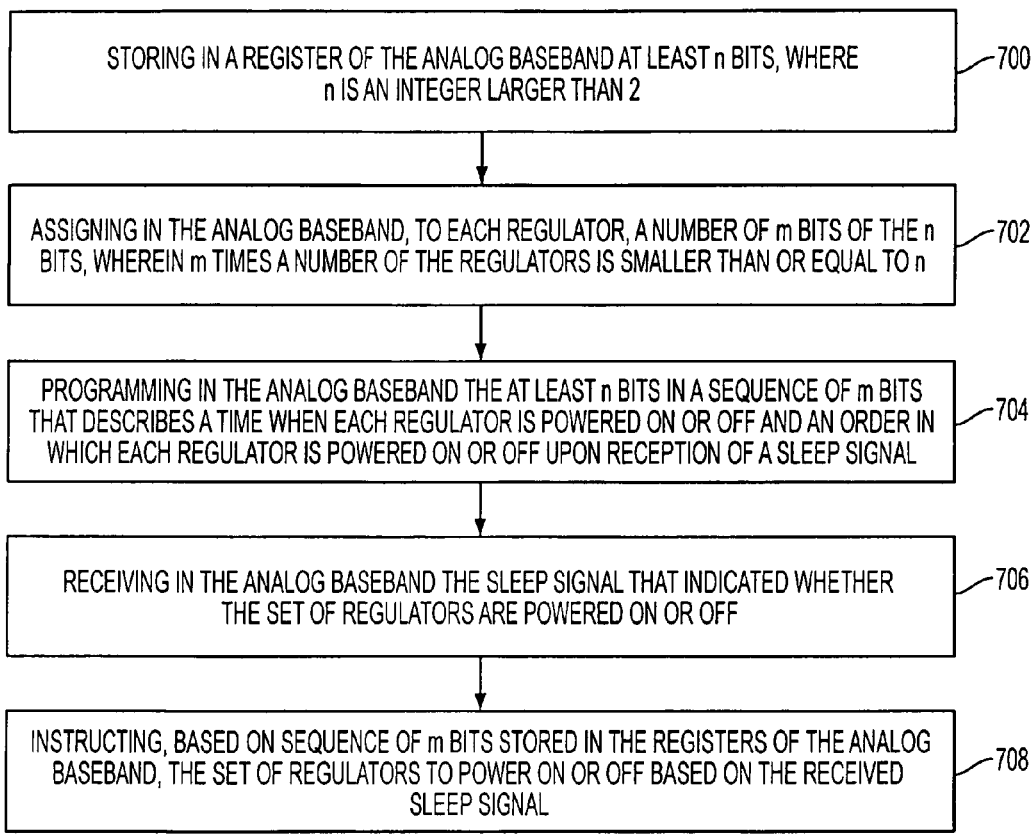
FIG. 7 is a flow diagram showing steps performed for powering on or off a set of regulators according to an exemplary embodiment.

According to an exemplary embodiment, FIG. 7 illustrates a method for powering on and off a set of regulators in the analog baseband, where each regulator is configured to provide a predefined voltage. As shown in FIG. 7, there is a step 700 of storing in a register of the analog baseband at least n bits, where n is an integer larger than 2, a step 702 of assigning in the analog baseband, to each regulator, a number of m bits of the n bits, where m times a number of the regulators is smaller than or equal to n, a step 704 of programming in the analog baseband the at least n bits in a sequence of m bits that describes a time when each regulator is powered on or off and an order in which each regulator is powered on or off upon reception of a sleep signal, a step 706 of receiving in the analog baseband the sleep signal that indicates whether the set of regulators are powered on or off, and a step 708 of instructing, based on sequence of m bits stored in the registers of the analog baseband, the set of regulators to power on or off based on the received sleep signal.

Figure 8:
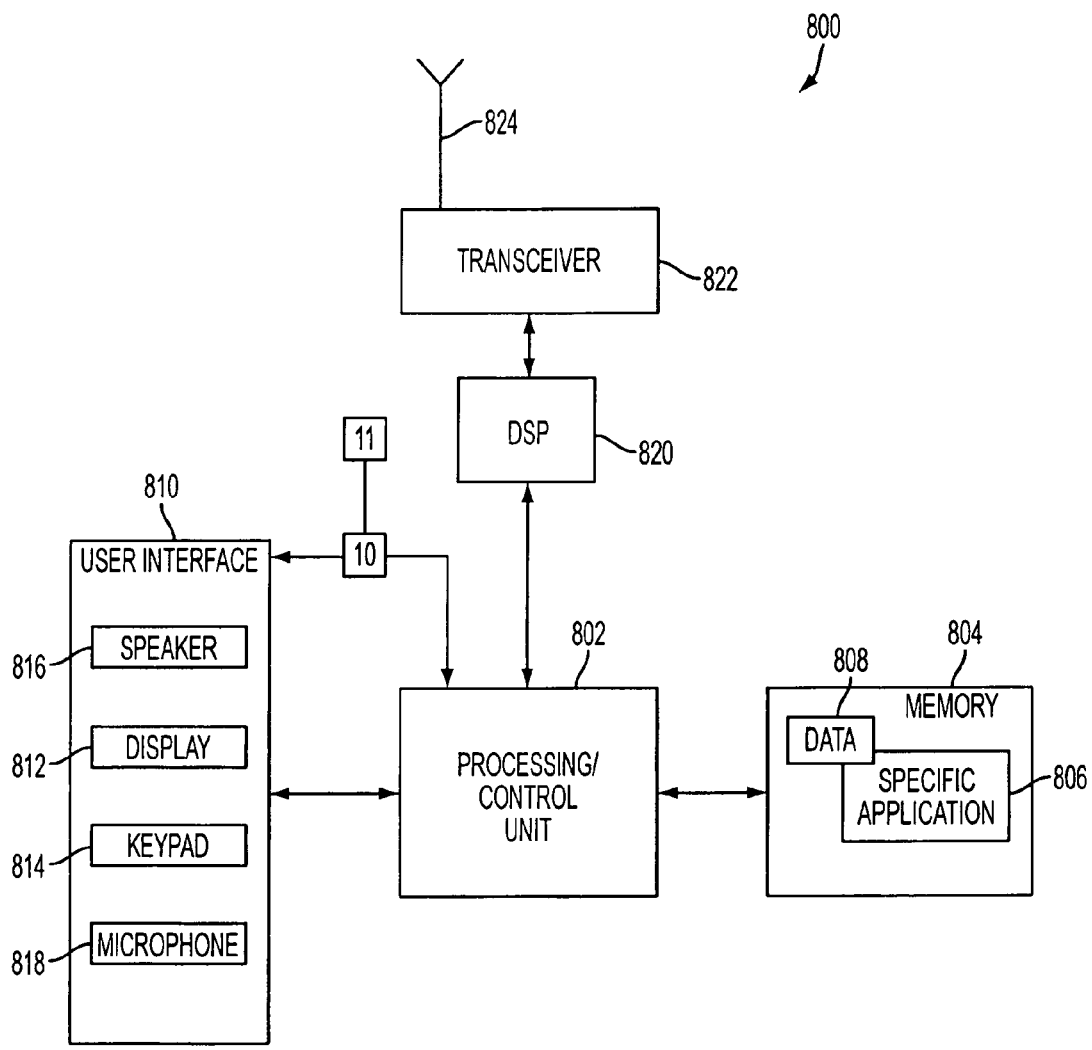
FIG. 8 is a schematic diagram of a mobile terminal that includes an analog baseband.

For purposes of illustration and not of limitation, an example of a representative mobile platform capable of carrying out operations in accordance with the exemplary embodiments is illustrated in FIG. 8. It should be recognized, however, that the principles of the present exemplary embodiments are equally applicable to standard mobile platforms.

The exemplary mobile platform arrangement 800 may include a processing/control unit 802, such as a microprocessor, reduced instruction set computer (RISC), or other central processing module. The processing unit 802 need not be a single device, and may include one or more processors. For example, the processing unit 802 may include a master processor and associated slave processors coupled to communicate with the master processor.

The processing unit 802 may control the basic functions of the mobile platform as dictated by programs available in the storage/memory 804. Thus, the processing unit 802 may execute the functions described in FIGS. 4 to 7. More particularly, the storage/memory 804 may include an operating system and program modules for carrying out functions and applications on the mobile platform. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the mobile platform arrangement 800 via data signals, such as being downloaded electronically via a network, such as the Internet.

One of the programs that may be stored in the storage/memory 804 is a specific program 806. The specific program 806 may interact with the set of regulators 10, which receive a voltage from battery 11 to supply various user interfaces 810 with a predetermined voltage. The program 806 and associated features may be implemented in software and/or firmware operable by way of the processor 802 or the registers 24. The program storage/memory 804 may also be used to store data 808, such as the sequence of powering on and off various radio interface components or other data associated with the present exemplary embodiments. In one exemplary embodiment, the programs 806 and data 808 are stored in non-volatile electrically-erasable, programmable ROM (EEPROM), flash ROM, etc. so that the information is not lost upon power down of the mobile platform 800.

The processor 802 may also be coupled to user interface 810 elements associated with the mobile platform. The user interface 810 of the mobile platform may include, for example, a display 812 such as a liquid crystal display, a keypad 814, speaker 816, and a microphone 818. These and other user interface components are coupled to the processor 802 as is known in the art. The keypad 814 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The mobile platform arrangement 800 may also include a digital signal processor (DSP) 820. The DSP 820 may perform a variety of functions, including analog-to-digital (A/D) conversion, digital-to-analog (D/A) conversion, speech coding/decoding, encryption/decryption, error detection and correction, bit stream translation, filtering, etc. The transceiver 822, generally coupled to an antenna 824, may transmit and receive the radio signals associated with a wireless device.

The mobile platform arrangement 800 of FIG. 8 is provided as a representative example of a computing environment in which the principles of the present exemplary embodiments may be applied. From the description provided herein, those skilled in the art will appreciate that the present invention is equally applicable in a variety of other currently known and future mobile and fixed terminal environments. For example, the analog baseband 22 and associated features, and registers 24, may be stored in a variety of manners, may be operable on a variety of processing devices, and may be operable in mobile devices having additional, fewer, or different supporting circuitry and user interface mechanisms. It is noted that the principles of the present exemplary embodiments are equally applicable to non-mobile platforms, i.e., landline systems.

The disclosed exemplary embodiments provide a system, a method and a computer program product for powering up or down various modules in a programmable sequence, with variable time intervals between the powering of each module. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

What is claimed is:

1. A method for powering on and off a set of regulators in an analog baseband chip, wherein each regulator is configured to provide a predefined voltage, the method comprising:
   storing in a register disposed on the analog baseband chip at least n bits, where n is an integer larger than 2;
   assigning in the analog baseband chip, to each regulator, a number of m bits of the n bits, wherein m times a number of the regulators is smaller than or equal to n;
   programming in the analog baseband chip the at least n bits in a sequence of m bits that describes a time when each regulator is powered on or off and an order in which each regulator is powered on or off upon reception of a sleep signal;
   receiving in the analog baseband the sleep signal that indicates whether the set of regulators are powered on or off; and
   instructing, based on sequence of m bits stored in the registers disposed on the analog baseband chip, the set of regulators to power on or off based on the received sleep signal.

2. The method of claim 1, further comprising:
   repeating the receiving and instructing steps without repeating the other steps each time a sleep signal is received.

3. The method of claim 1, wherein the set of regulators is not associated with a device that is part of a radio interface.

4. The method of claim 1, where the programming step further comprises:
   inserting an extended delay time within the sequence, between two consecutives regulators that are powered on or off.

5. The method of claim 1, wherein the programming step is dependent on characteristics of a mobile platform in which the analog baseband chip is incorporated.

6. The method of claim 1, wherein the programming step is application dependent such that the order of powering on and off the set of regulators is based on components of the mobile platform connected to the set of regulators.

7. The method of claim 1, wherein the instructing step further comprises:
   powering on or off the set of regulators without exchanging data with an inter-integrated circuit (I2C) or a processor that is connected to the analog baseband chip.

8. The method of claim 4, further comprising:
   programming each of the regulators to have a same delay time relative to a previous regulator and a following regulator except for when the extended delay time is used.

9. The method of claim 6, further comprising:
   defining the application based on specific components of the mobile platform.

10. The method of claim 9, wherein the specific components include at least one of a camera, a sound part, a microphone, a vibration mechanism, a keyboard, or a display.

11. An analog baseband chip for powering on and off a set of regulators in a mobile platform, comprising:
    the set of regulators, each configured to provide a predetermined voltage to a corresponding component of the mobile platform;
    a register connected to the set of regulators and configured to store at least n bits, where n is an integer larger than 2, the register being also configured to assign to each regulator a number of m bits of the n bits, wherein m times a number of the regulators is smaller than or equal to n, the at least n bits being programmed in a sequence of m bits that describes a time when each regulator is powered on or off and an order in which each regulator is powered on or off upon reception of a sleep signal in the analog baseband; and
    an input/output interface configured to receive the sleep signal, which indicates whether the set of regulators are powered on or off.

12. The analog baseband chip of claim 11, wherein the same sequence of bits is applied to the regulators any time a new sleep signal is received.

13. The analog baseband chip of claim 11, wherein the set of regulators is not associated with a device that is part of a radio interface.

14. The analog baseband chip of claim 11, wherein the sequence of bits is programmed to insert an extended delay time between two consecutives regulators that are powered on or off.

15. The analog baseband chip of claim 11, wherein the sequence of bits is programmable based on characteristics of a mobile platform in which the analog baseband is incorporated.

16. The analog baseband chip of claim 11, wherein the sequence of bits is programmable such that an order of powering on and off the set of regulators is based on specific components of the mobile platform connected to the set of regulators.

17. The analog baseband chip of claim 11, wherein the set of regulators are powered on or off based only on the sleep signal and without exchanging data with an inter-integrated circuit (I2C) or a processor that is connected to the analog baseband in a mobile platform.

18. The analog baseband chip of claim 11, wherein the set of regulators are repeatedly powered on or off in a same order based on a received new sleep signal.

19. The analog baseband chip of claim 14, wherein the sequence of bits is programmed such that each of the regulators has a same delay time relative to a previous regulator and a following regulator except for when the extended delay time is used.

20. The analog baseband chip of claim 16, wherein the specific components include at least one of a camera, a sound part, a microphone, a vibration mechanism, a keyboard, or a display.

21. An analog baseband chip for powering on and off a set of means for regulating in a mobile platform, comprising:
   the means of regulating being configured to provide a predetermined voltage to a corresponding component of the mobile platform;
   means for storing bits connected to the means for regulating and configured to store at least n bits, where n is an integer larger than 2, the means for storing being also configured to assign to each means for regulating a number of m bits of the n bits, wherein m times a number of the means for regulating is smaller than or equal to n, the at least n bits being programmed in a sequence of m bits that describes a time when each means for regulating is powered on or off and an order in which each means for regulating is powered on or off upon reception of a sleep signal in the analog baseband; and
   an input/output interface configured to receive the sleep signal and to inform the analog baseband about receiving the sleep signal, which indicates whether the set of means for regulating are powered on or off.

22. A computer readable medium including computer executable instructions, wherein the instructions, when executed by a processor, cause the processor to perform instructions for powering on and off a set of regulators in an analog baseband chip, wherein each regulator is configured to provide a predefined voltage, the instructions comprising:
   storing in a register disposed on the analog baseband chip at least n bits, where n is an integer larger than 2;
   assigning in the analog baseband chip, to each regulator, a number of m bits of the n bits, wherein m times a number of the regulators is smaller than or equal to n;
   programming in the analog baseband chip the at least n bits in a sequence of m bits that describes a time when each regulator is powered on or off and an order in which each regulator is powered on or off upon reception of a sleep signal;
   receiving in the analog baseband chip the sleep signal that indicates whether the set of regulators are powered on or off; and
   instructing, based on sequence of m bits stored in the registers disposed on the analog baseband chip, the set of regulators to power on or of based on the received sleep signal.

* * * * *